United States Patent [19]

Story et al.

[11] 4,345,146
[45] Aug. 17, 1982

[54] APPARATUS AND METHOD FOR AN ELECTRONIC IDENTIFICATION, ACTUATION AND RECORDING SYSTEM

[76] Inventors: James R. Story, 13380 SW. 82 St., Miami, Fla. 33183; Joseph J. Sobodowski, IV, 13020 SW. 112 Ave., Miami, Fla. 33176

[21] Appl. No.: 133,946

[22] Filed: Mar. 25, 1980

[51] Int. Cl.$^3$ .............................................. G07F 7/08
[52] U.S. Cl. ................................. 235/381; 235/449; 235/451; 235/487; 235/488
[58] Field of Search ............... 235/381, 449, 487, 488, 235/451; 200/46; 141/98

[56] References Cited

U.S. PATENT DOCUMENTS

| | | | |
|---|---|---|---|
| 3,274,352 | 9/1966 | Ryno | 200/46 |
| 3,644,713 | 2/1972 | Hayakawa | 200/46 |
| 3,650,303 | 3/1972 | Chambers | 141/98 X |
| 4,179,064 | 12/1979 | Yoshioka | 235/487 |
| 4,258,253 | 3/1981 | Fisher | 235/449 |

Primary Examiner—Harold I. Pitts
Attorney, Agent, or Firm—Quaintance & Murphy

[57] ABSTRACT

Dispensing of commodities such as bulk liquids, gases, granules and powders is monitored electronically by identifying receivers of the commodities with specific codes and relating those codes to amounts dispensed by commodity dispensers. The specific apparatus includes a passive module attached to the commodity receiver and a reader linked to the commodity dispenser by radio transmitter or hard-wired. The passive module includes a planar member therein with a code thereon in form of a pattern of conductive and non-conductive areas, the particular organization of which determines the code identifying a particular commodity receiver. The reader includes: an array composed of pairs of opposed inductors for alignment with the conductive and non-conductive areas; a multiplexer for indexing the pairs of opposed inductors to determine if an area is conductive or non-conductive, and a transmitter for relaying the code to the commodity dispenser. The commodity dispenser includes a signal receiver for coordinating the identity of the commodity receiver with the amount of commodity dispensed. The apparatus has a specific application in controlling and monitoring the dispensing of fuel to fleet vehicles.

17 Claims, 11 Drawing Figures

APPARATUS AND METHOD FOR AN ELECTRONIC IDENTIFICATION, ACTUATION AND RECORDING SYSTEM

BACKGROUND OF THE INVENTION

1. Field of the Invention

This invention relates to apparatus for identifying electronically receivers of commodities. More particularly, this invention relates to apparatus for identifying electronically receivers of commodities and for coordinating that identification with dispensing of the commodities.

2. Background of the Invention

Many systems and devices exist that are used to identify various objects, e.g., optical readers, magnetic strip readers, magnetic ink readers, Hall effect detectors, radiation detectors, varying resistance systems, inductance systems, capacative systems or combinations thereof, laser or light reflected detectors, and various other systems both solid state and otherwise. All of these devices serve their purpose when constrained to certain uses; however, some are used in areas where more suitable devices are needed. For example, organizations with fleet vehicles that are refueled by large tanker trucks have a very limited choice in automatic systems to assist in keeping track of which vehicle received how much feel. One approach is manual recording by the tanker operator; another is having a card associated with each vehicle wherein the card is used to energize an electronic system on the tanker truck for each vehicle refueled. A keyboard can also be used by the tanker operator to punch in a vehicle I.D. number for each vehicle refueled. The disadvantages of these techniques are obvious in that the error margin is very high, security is non-existent, and carrying or having access to a card for each vehicle presents many logistical and other problems. Moreover, with the above systems, the tanker operator must constantly walk back and forth between the tanker and the vehicle being refueled.

In view of the aforementioned deficiencies, there is need for improved electronic identification arrangements for fleet vehicles and other applications.

SUMMARY OF THE INVENTION

The instant invention contemplates identification apparatus including coded members, each comprising a substrate with a distinct pattern of conductive and non-conductive areas, the arrangement of which identifies the particular coded member. The apparatus further includes a reader having pairs of opposed inductors which are positioned for alignment with the conductive and non-conductive areas between the opposed inductors and which, when aligned with the areas, deciphers the code by detecting which areas are conductive and which are non-conductive. Preferably, the reader includes a multiplexer which indexes the pairs inductors and a transmitter which relays the deciphered code to a processing station.

According to a particular embodiment of the instant invention, each coded member is retained in a protective housing which is secured to a vehicle. The coded member is read each time the vehicle is fueled and the code assigned to the vehicle is coordinated with the amount of fuel dispensed to the vehicle.

BRIEF DESCRIPTION OF THE DRAWINGS

The overall system has many improvements, innovations and advantages which will be described in more detail below from a consideration of the specification with reference to the accompanying drawings forming part thereof, and in which like numerals correspond to like parts throughout the several views of the invention, and wherein:

FIG. 6A is a front perspective view showing the passive module prior to mounting in a circular hole in an exterior vehicle panel;

FIG. 6B is a side elevation taken along line B—B of FIG. 6C and showing the passive module mounted within the vehicle panel;

FIG. 6C is a front view of the passive module with the door open;

FIG. 6D is a cross section of the passive module taken along Line D—D of FIG. 6B;

FIG. 6E is a perspective view of a shield which is inserted in the module with a coded substrate sandwiched therebetween, and FIG. 6F is a rear perspective view of the passive module.

Figure 1:
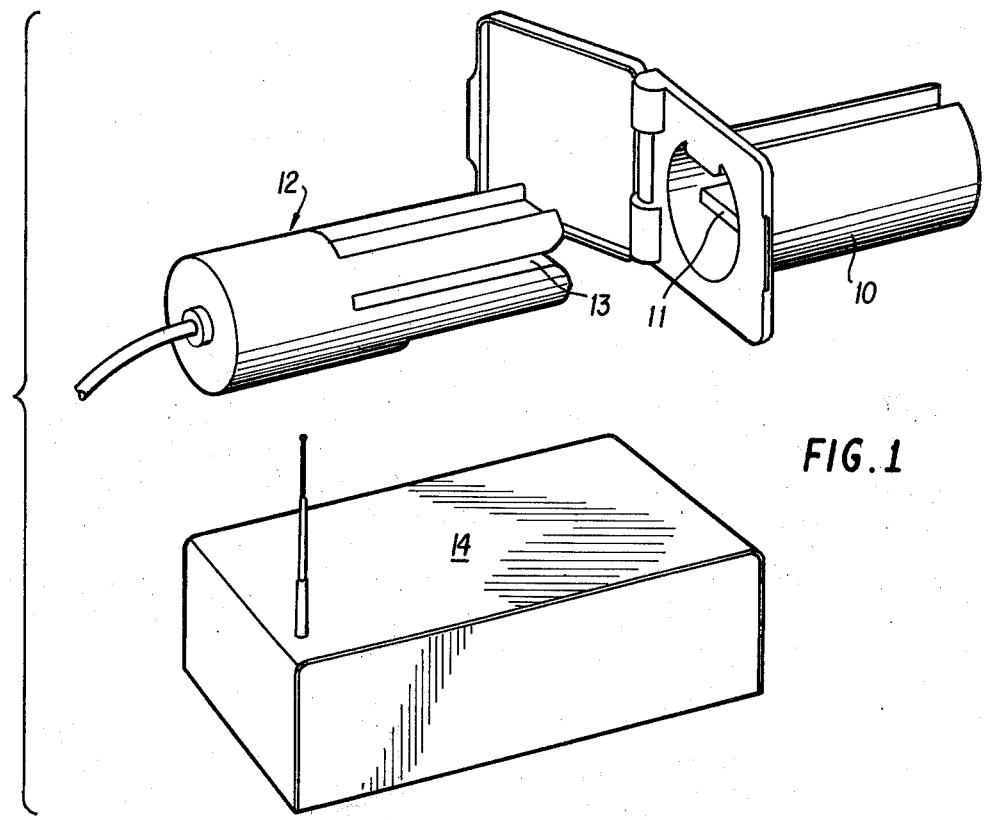
FIG. 1 is an overall view of the system showing the three components that make up the system; the passive module, identifier-transmitter or reader and receiver.

While the present invention will be described hereinafter with particular reference to the accompanying drawings, in which one embodiment of the present invention is shown, it is to be recognized at the outset of the following description that persons skilled in the applicable arts will be able to apply the principles of this invention to circuits which may differ in some specific details. Accordingly, the description which follows and the drawings to which that description relates are to be understood as a broad disclosure teaching the general utility of this invention, and are not to be taken as limiting upon the manner in which this invention may be used.

The present invention is designed to eliminate serious shortcomings of other existing techniques and systems. Part of the invention is a small passive module, which is part of the system used to identify a vehicle. It can be permanently attached to the vehicle. The module is weatherproof, its accuracy is not affected by the harsh environment typically found in refueling areas such as gasoline, oil, grease, dirt, etc. Its design is such that abusive use will not affect its accuracy. Since it can be permanently mounted on the vehicle, there is no logistics problem. It provides a secure system in that there is no obvious way to duplicate and program the passive modules, especially in conjunction with other security features of the total system. The passive module is very inexpensive to manufacture which makes the system practical for large numbers of vehicles. Due to wide tolerances of operation, no moving parts, no electrical connections, permanent mounting to vehicles or other objects, and being immune to various contaminants and environments, this invention is a great improvement over other existing devices.

The identifier-transmitter unit or reader is designed to be small, lightweight, portable and rugged. It is used to detect the unique identification code (in the passive module) and to send this code to a receiver unit for processing and activation of other systems that are functionally associated with the unit on which the passive module is mounted. The identifier-transmitter unit or reader can have several security features to insure accurate transmission of the passive module's code and to prevent a code being sent by false activation. These features consist of several "security only" detectors which are placed in certain positions within the identifier-transmitter head, so that they prevent false activation. Each code is transmitted and analyzed at the receiver to prevent false code reception. Each code can consist of a series of digital bits at a specific frequency in a specific frequency in a specific format to prevent false identification at the receiver.

The receiver unit is also designed to help eliminate false or unsecure information. Several features accomplish this: a detailed check of each code it receives, including the number of bits, timing of bits, frequency and bit stream character. The receiver is also designed to increase security, e.g., the receiver will receive a valid code from the identifier-transmitter and then the receiver will send activation and operation signals for a preset fixed time and after this time, the receiver cannot be reactivated by the same code without a special key. If the receiver is used to record volume amounts, an upper limit is automatically set by the receiver and the receiver will deactivate when that limit is reached for that particular module code.

Referring now more particularly to the accompanying drawings, FIG. 1 shows the three major components of the overall invention, 10 is the body of the passive module which has two purposes; one it provides a means to be mounted on other items and two it serves as a case or holder for the web, 11. The web 11 holds small metallic shields which determine the actual code for a particular module. A small, portable identifier-transmitter or reader 12 has an opening 13 which fits over the web 11 in order to detect small metallic shields contained in the web 11. The reader 12 is designed to slide in and out of the module body 10. Electronics in the identifier-transmitter or reader 12 decodes the contents of the passive module 10 while the reader is inserted into the passive module and transmits that code to a signal receiver 14.

The signal receiver 14 accepts inputs from the identifier-transmitter 12 and electronically checks for the proper frequency, spacing of bits, number of bits and relationship between bits to insure a valid code has been received. The signal receiver 14 then performs many custom functions utilizing an internal microcomputer which is interfaced by connections 15 to various apparatus external to the signal receiver.

Figure 2:
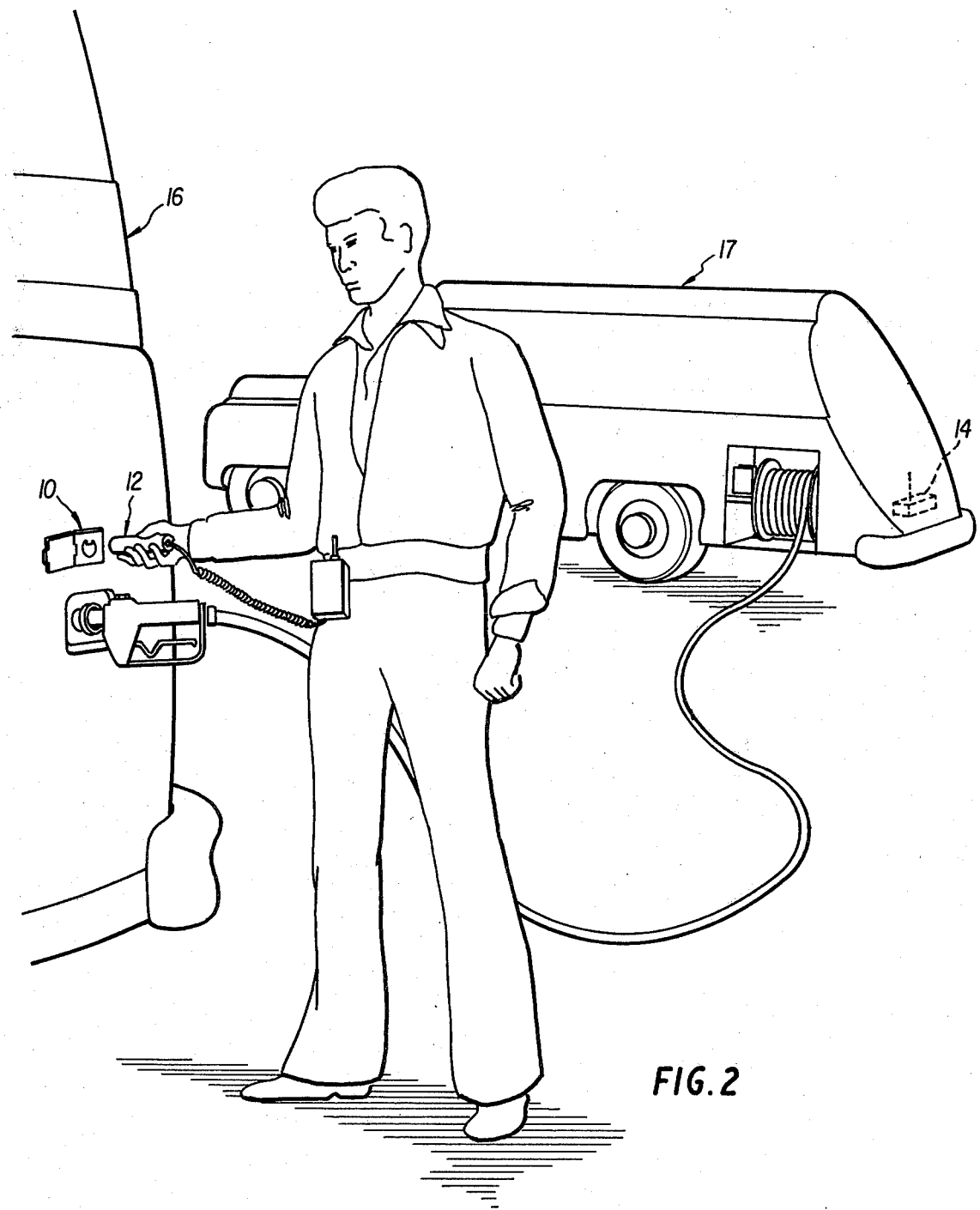
FIG. 2 shows a typical application where the module is mounted on a vehicle. The identifier-transmitter is held in the hand of the operator and the receiver is mounted in the tanker refueler truck.

An example of a typical use or preferred of the system is shown in FIG. 2 where the passive module 10 is mounted to a vehicle 16 adjacent to the vehicle's fuel cap. When the identifier-transmitter 12 is inserted into the module 10, a code corresponding to vehicle's 16 identification number is sent by the identifier-transmitter 12 to the signal receiver 14 verifies a proper, valid code and truck 17. The receiver verifies a proper, valid code and then sends electrical signals to enable the fuel flow system, allowing fuel to be dispensed to the vehicle 16. The receiver 14 constantly monitors the fuel flow and disables the fuel flow system upon either a preset amount of fuel or a preset amount of elapsed time to prevent personnel from filling their own containers. The fuel amount and vehicle I.D. are recorded inside the receiver in solid state memory. The tanker truck operator continues to refuel vehicles, 65,536 different vehicles for a typical system, and at the end of his run, all receiver information is placed on a permanent storage medium, e.g., cassette tape or EAROMS.

While FIG. 2 illustrates a preferred embodiment of the system's use, it should be kept in mind that any commodity receiving instrumentality which receives any commodity dispensed by a commodity dispenser may also utilize the system. For example, the passive module 10 can be secured to a building and the signal receiver 14 to a fuel oil truck. The system may be utilized wherever there is a need to identify a receiver of a commodity and to coordinate reception of that commodity with dispensation of that commodity. Monitoring and control of fuel dispensed to fleet vehicles as is disclosed in FIG. 2 happens to be a particularly appropriate application of the system.

Figure 3:
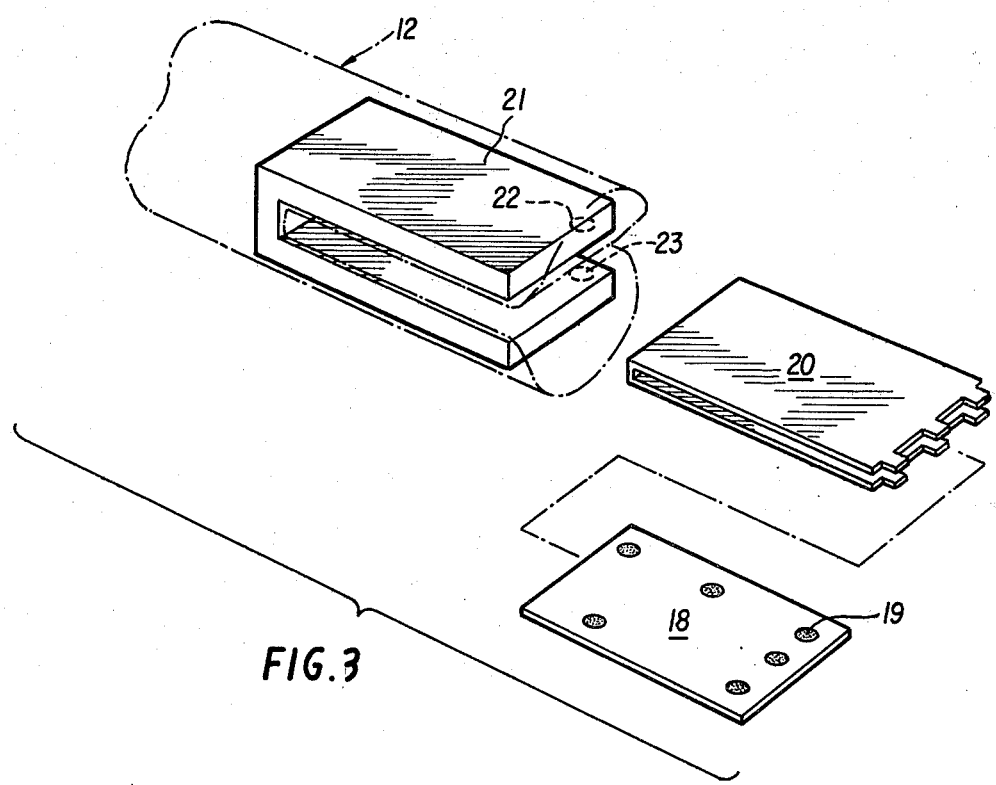
FIG. 3 shows the physical layout of a typical coded module web, its protective cover and the coil unit used to detect the code.

The details of the passive module metallic shields and the coils of the detector are shown in FIG. 3. The passive module's web is made of 2 parts shown in FIG. 3. An insulator 18 such as thin (1/32") plastic is used as a substrate on which to place a set of metallic conductors 19 to form conductive areas. These metallic conductors can be made from aluminum foil, electrically conductive spray paint, iron, steel or any other metallic conductor. The conductive areas formed by conductors 19 taken in combination with non-conductive areas form a pattern, the particular organization of which determines the code identifying the particular vehicle to which the module 10 is attached. A non-conductive sheath 20 completes the web by acting as a rigid cover to protect (and hide) the metallic conductors 19 and plastic substrate 18. Note, the web assembly (including sheath and metallic conductors) fits inside the body of the passive module 10 (FIG. 1) such that only the sheath 20 is visible. The number of metallic conductors 19 in FIG. 3 depends on the size of the web. A prototype web has been constructed with sixteen metallic conductors 19 on the substrate 18 with a size of 1" by 2" (room for 16 metallic conductors) meaning that at least 65,536 different objects (vehicles) can be identified.

There are several techniques for constructing the metallic conductors 19 on the substrate 18, but since security is important, as well as economy, a most effective technique to accomplish both security and economy is to use two black paint-like coatings; one, an electrically conductive coating and the other an electrically insulative coating. The resulting form 18 and metallic conductors 19 would be a solid black surface with no visible or other human sensory indications of its function or code. Thus, if an attempt is made to learn how the passive module 19 works by someone taking the passive module 19 apart, one would find only black paint on the inside, and it would require special knowledge to discover how to duplicate or defeat the system.

The identifier-transmitter 12 has an opening 21 designed to fit snugly over the web sheath 20, and embedded in both side of this opening 21 are sixteen pairs of inductors 22 and 23 (only two of which are shown) that correspond to the sixteen locations inside the web such that when the identifier-transmitter or reader 12 is inserted so that the web assembly 18 and 20 fits inside the opening 21, each presence or absence of a metallic conductor is exactly between a set of two inductors 22 and 23. The presence of a metallic conductor 19 between two inductors 22 and 23 will effectively block the lines of flux that normally would flow between the two inductors 22 and 23. Since there is a set of two inductors 22 and 23 per possible location of a metallic conductor 19, if there are 16 possible locations of metallic conductor 19, then there are also 16 sets of two inductors 22 and 23 per set to match the 16 locations of metallic conductors 19. All the inductors 22 and 23 are stationary and contained behind a thin (1/64") layer of non-conductive material such that no inductor is visible on the inside wall of the opening 21.

The important and novel feature of this sealed inductor 22 and 23 and the sealed metallic conductor 19 arrangement is that it is weatherproof, liquid proof, wear proof (no contacts) and immune to dirt, grit, grease, etc. Also, this arrangement does not require close tolerances for reliable operation. The main feature for which this arrangement is designed is the mounting of the passive module 10 on any desired commodity receiving apparatus, such as a vehicle, for permanent electronic identification of that apparatus and thousands of apparatuses can be identified without any of logistics or reliability problems associated with other systems.

Figure 4:
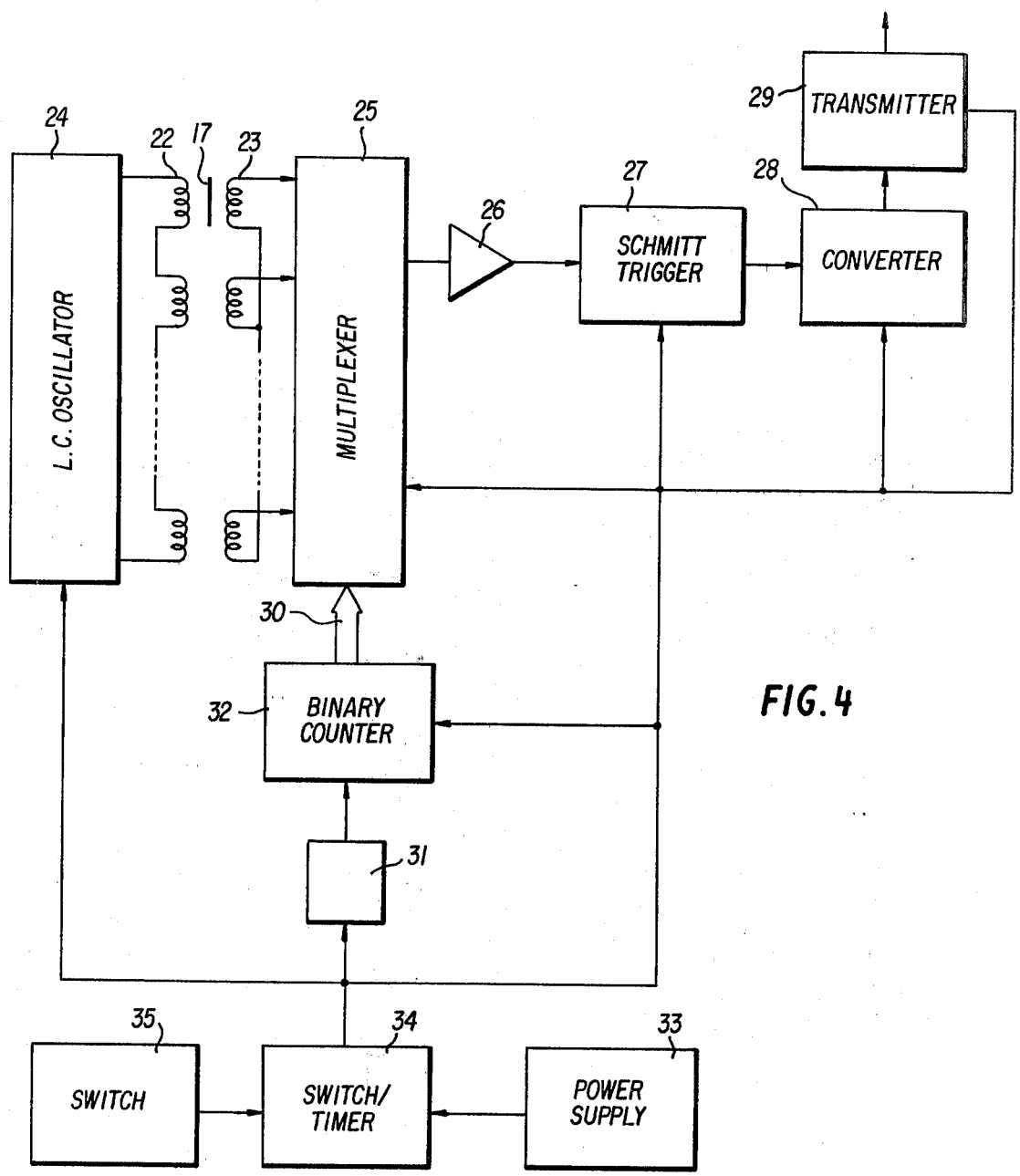
FIG. 4 is a block diagram of the coil assembly and identifier-transmitter.

Now considering the electronic operation as related to the diagram of the identifier-transmitter or reader 12 shown in FIG. 4. A single transistor LC oscillator 24 is used to generate a changing electromagnetic field around each of the inductors 22. Inductors 22 are part of a frequency determining LC network for an oscillator 24. The varying magnetic field produced by the oscillator 24 and the inductors 22 is picked up by corresponding inductors 23 aligned with inductors 22 provided there is no metallic conductor 19 between corresponding inductors 22 and 23. If there is a metallic conductor 19 between the inductor pairs 22 and 23, then only a small portion of the varying magnetic flux lines produced from inductors 22 will reach the corresponding inductors 23 thus inducing a significantly small voltage as compared to an inductor pair 22 and 23 with no metallic conductor 19 between the inductor pair.

In order to electronically "look at" each inductor pair, one at a time, an analog multiplexer 25 indexes each inductor pair by connecting each inductor 23 serially, one at a time, to the amplifier 26. If there are sixteen inductor pairs 22 and 23, then there are $2^{16} = 65,536$ different and unique ways to pattern the presence and absence of the metallic conductors 19 or conductive areas between the sixteen inductor pairs 22 and 23. Thus, the output of the multiplexer 25 and amplifier 26 is a serial frequency stream of high and low amplitudes corresponding to the absence or presence of the metallic conductors 19, respectively. This conversion is accomplished by the converter 28. The converter 28 is transmitted via a transmitter 29, which can be RF connected or hardwired to the signal receiver 14.

The technique for cycling the multiplexer's 25 address inputs 30 is accomplished by a standard square wave oscillator 31 and binary counter 32.

To conserve power and increase battery life (if a battery power supply is used) the power supply 33 is connected to all the other components in the identifier-transmitter circuit through an electronic switch/timer 34, which is activated by a microswitch 35. The timer part of the switch/timer 35 turns the power from the power supply 33 off immediately after all binary bits have been transmitted by the transmitter 29. The microswitch 35 is placed on the identifier-transmitter 12 body, such that the microswitch 35 is activated by inserting the identifier-transmitter 12 into the passive module 10. This technique increases battery life to virtually shelf life.

Figure 5:
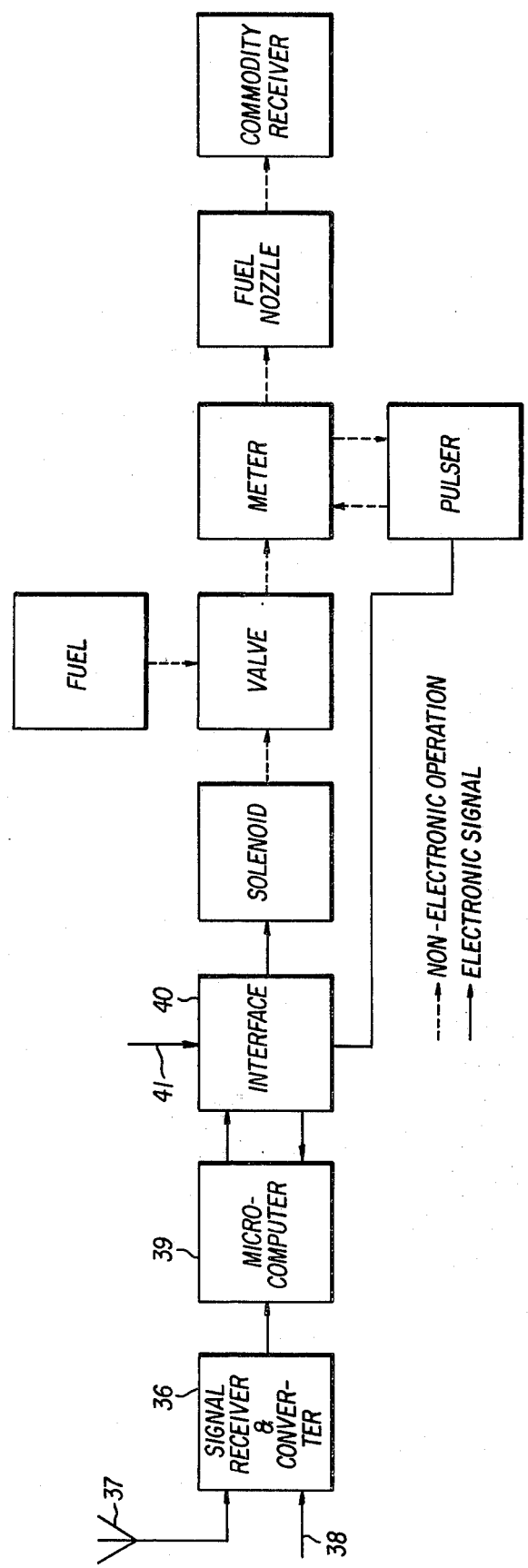
FIG. 5 is a block diagram of the receiver showing typical interface connections.

The receiver 14 shown in block diagram form in FIG. 5 completes the total system. The input section 36 receives the serial bit stream from the identifier-transmitter either through air RF transmission using antenna 37 or through hardwired connection 38. The input section 36 then does any necessary conversion so that the signal fed to the micro-computer 39 is a typical system with processor, ROM, RAM and I/O parts; and is used to make several checks on the signal from the input section 36 to eliminate false or noisy input signals. When the microcomputer 39 has established that a valid code was received by input section 36, the microcomputer 39 sends appropriate signals to interface 40, which are converted by the interface 40 internal electronics to appropriate control signals 15 which are used to control any functions external to the receiver 14. The microcomputer can also receive signals from other devices as needed through interface connections 41. As an example of signals connected to the interface lines 15 and 41 is based on the application shown in FIG. 2 where signals 15 control the on-off operation of the fuel flow solenoid in the tank truck 17 and signals 41 input the fuel volume that flows through the solenoid valve, which volume is stored in the microcomputer 39 memory. As is seen in FIG. 5, the interface controls a solenoid which operates a valve that controls the flow of fuel. The valve operates a meter which measures the amount of fuel dispensed and the meter operates a fuel nozzle which delivers the fuel to the vehicle receiving the fuel. A pulser is operated by the meter and feeds information back to interface 40. The microcomputer 39 has internal programming which takes the place of hardwired logic so that the receiver 14 finctions can be modified easily through new ROM programming. This makes the receiver 14 very adaptable to many different uses.

Figure 6A:
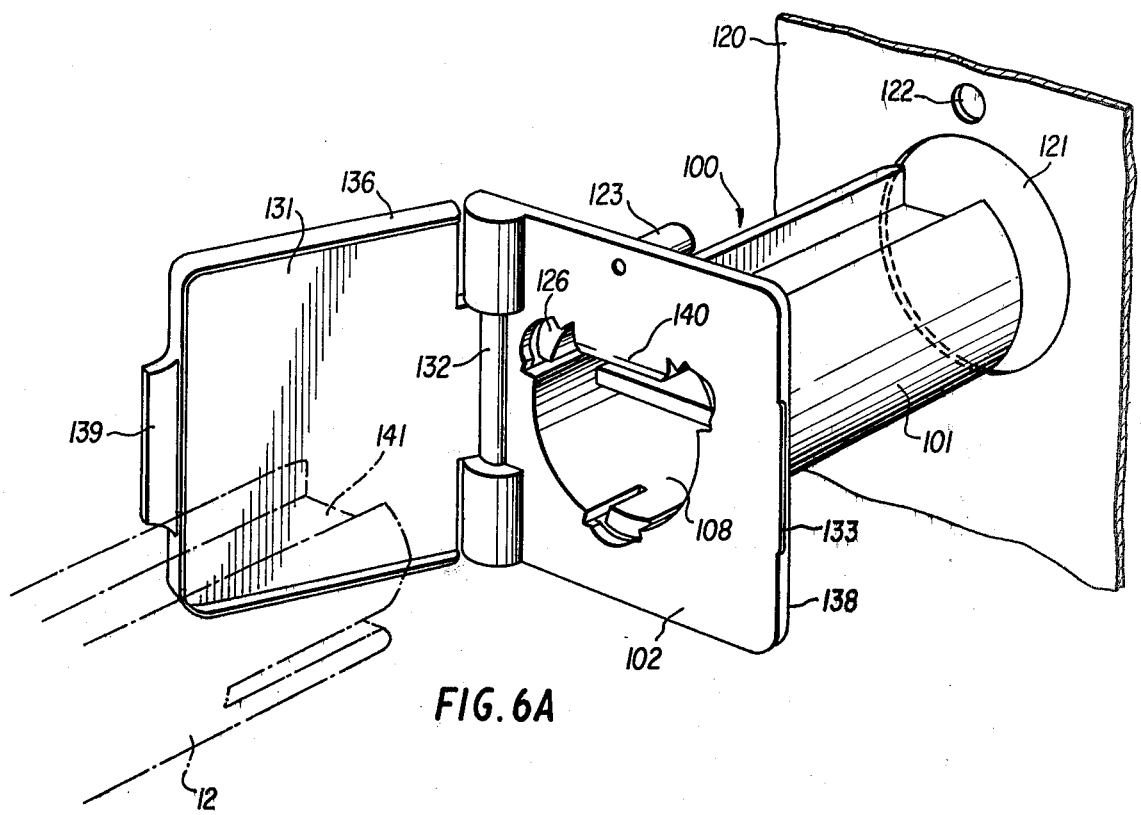
FIGS. 6A–6F are detailed views of the passive module with the reader shown in phantom, more specifically.
Figure 6B:
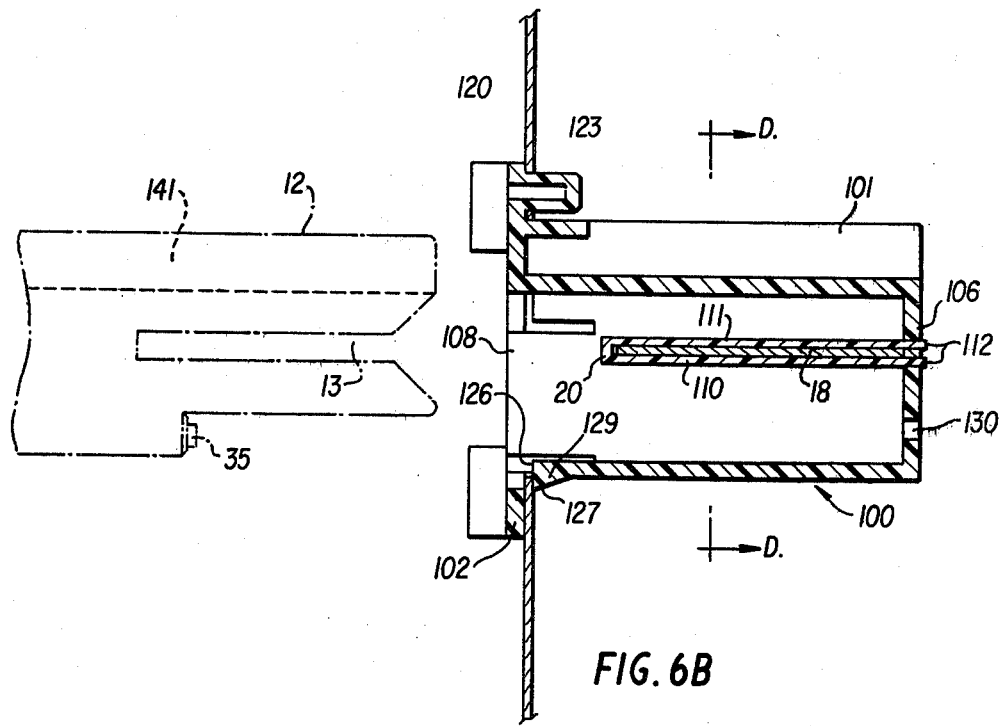
Figure 6C:
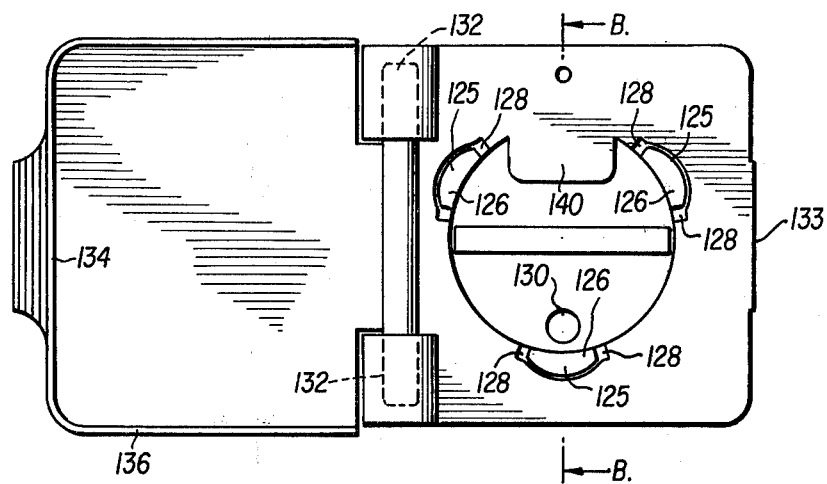
Figure 6D:
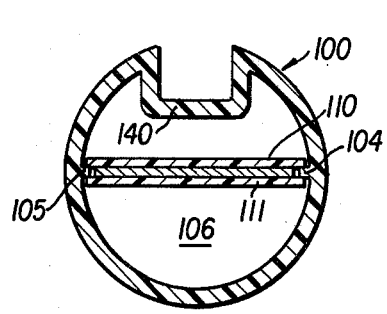
Figure 6E:
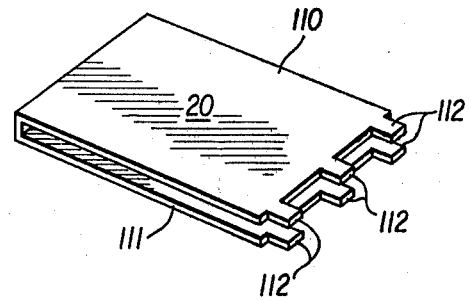
Figure 6F:
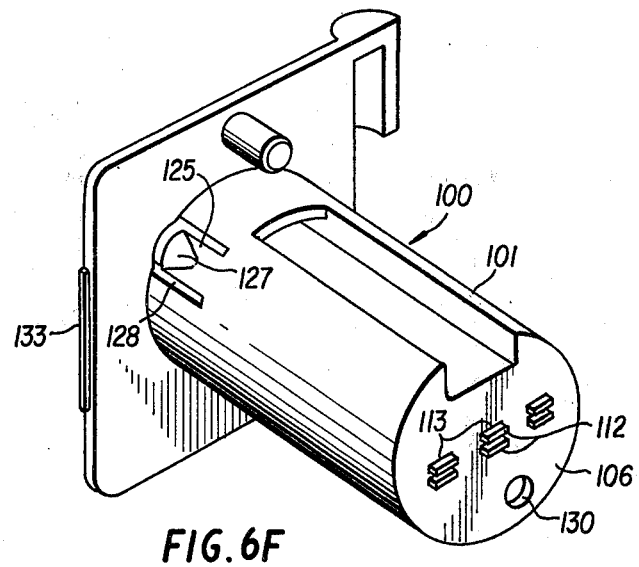

Referring now specifically to the passive module construction shown in FIGS. 6A-6F, the passive module in its specific embodiment is designated generally by the numeral 100 and includes a barrel portion 101 and an exterior flange 102 formed at one end of the barrel portion. As is seen in FIG. 6D, the barrel portion 101 has a pair of opposed ribs 104 and 105 extending from a rear wall 106 partway to the opening 108 of the barrel. The ribs 104 and 105 are received between upper and lower surfaces 110 and 111 of the U-shaped web sheath 20 which receives the coded substrate 18 (see also FIG. 3). As is seen in FIGS. 6A and 6F, the sheath 20 has three pairs of tabs 112 thereon which project through holes 113 in the rear wall 106 of the barrel 101. In order to permanently secure the web sheath 20 within the barrel 101 with the substrate 18 sandwiched between plates 110 and 111, the tabs 112 are upset after the assembly is inserted into the barrel.

As is seen in FIGS. 6A and 6B, the passive module 100 is retained on an exterior panel 120 of a vehicle by cutting a hole 121 in the exterior panel for receiving the barrel 101 and a hole 122 for receiving a locating pin 123 which projects rearwardly from the front flange 102. The barrel 101 has three detents 125 spaced 120° apart around its periphery (FIG. 66). Each detent 125 has a shoulder 126 and a cam surface 127 (FIGS. 6F and 6B). The detents 125 are cantilevered in slots 128 formed in the barrel 101 so that when the barrel is pressed through the hole 121 in panel 120 of the vehicle, cam surfaces 127 engage the edge of the hole 121 and deflect inwardly until the detent clears the inner surface of the panel, whereupon the detents restore to their original position and snap behind the inner wall of the panel with the shoulders 126 abutting the inner wall so as to clamp the wall between front flange 102 and the detents 125. Locating pin 123 passes through hole 122 so that the passive module 100 will not rotate in hole 121. Preferably, the pin 123 is at the top of flange 102 so that the coded substrate 18 and sheath 20 are disposed horizontally.

Since the passive module 100 is mounted on a vehicle in one embodiment, it is exposed to the elements and to fuel, oil and grease and therefore must be protected from moisture and other substances which can, over a period of time, degrade the conductive areas 19. To this end, the rear wall 106 has a drain hole 130 therein in order to let water out and a cover 131 is hinged at one side by a pintle 132 to the exterior flange 102. The cover 131 latches to the exterior flange 102 by receiving a lip 133 on the exterior flange in a slot 134 formed in a peripheral flange 136 that extends around three sides of the cover 131 in order to fit over the edge 138 of the exterior flange. A finger tab 139 projects from the peripheral flange 136 and is engaged to open the cover 131 so as to gain access to the interior of barrel 101.

Projecting downwardly into the barrel 101 is a thick rib 140 which is received in a slot 141 in the top of the reader or portable identifier-transmitter 12 in order to keep the reader or identifier-transmitter from rotating within the barrel 101 and thereby distorting or breaking the coded substrate 18 which is sandwiched in the slot 13. In essence, the rib 140 serves as a strain relief so that no twisting force can be applied to the coded substrate 18.

The aforedisclosed embodiments and examples are merely illustrative of the invention and the invention is to be limited only by the following claims.

We claim:

1. Apparatus for monitoring dispensing of commodities to a commodity receiver comprising in combination:
    passive identification means having a secret code unique to a particular commodity receiver;
    means for covering the secret code;
    means for securing the passive identification means to the commodity receiver;
    means for deciphering the secret code unique to the particular commodity receiver;
    R.F. means for transmitting the deciphered code as a R.F. signal;
    means for receiving the R.F. signal including the deciphered code, and
    means associated with the receiving means for relating the deciphered code to the amount of commodity dispensed to the particular receiver.

2. The apparatus of claim 1 wherein the passive identification means includes an insulating substrate with a unique pattern of conductive materials thereon completely covered by an opaque protective covering and wherein the means for deciphering the code includes an array of detectors which align with the conductive materials to indicate the presence thereof.

3. The apparatus of claim 2 wherein the unique pattern comprises conductive and non-conductive areas organized in a unique configuration.

4. The apparatus of claim 3 wherein the conductive areas are made of conductive paint and wherein a non-conductive paint of the same color as the conductive paint is applied over the substrate for camouflaging the conductors.

5. The apparatus of claim 1, 2, 3 or 4 wherein the deciphering means includes:
    an array of inductor pairs for alignment with both conductive areas and non-conductive areas;
    means for addressing each inductor pair to examine each area individually to determine if that area is conductive or non-conductive, and
    means for converting the results of the determination into the deciphered code for transmission by the RF transmitting means.

6. Apparatus for monitoring dispensing of fuel to a fleet of vehicles said apparatus comprising:
    a plurality of passive identification devices, one for each vehicle in the fleet and each including a secret code unique to a particular vehicle in the fleet;
    means for covering each of the identification devices to prevent visual inspection of the codes and to protect the identification devices from the environment;
    housings for containing the identification devices, said housings each including means for fixing an identification device therein and means providing space around the identification device;
    means on said housings for permanently fixing each housing to a vehicle;
    portable means for reading individual identification devices upon insertion of the portable means into the space in the housing around the identification devices;
    code processing means remote from and physically separate from the portable means for coordinating the code with fuel dispensing, and
    an R.F. link for connecting the portable reading means to the code processing means.

7. The apparatus of claim 6 wherein each passive identification device comprises a substrate with a pattern of conductive and non-conductive areas, the organization of which determines the code identifying a particular vehicle.

8. The apparatus of claim 7 wherein the shielding means comprises an opaque U-shaped sheath which sandwiches the coded substrate therebetween.

9. The apparatus of claim 8 wherein each housing has a pair of opposed ribs which are received within the sheath to support the sheath and wherein each housing includes a rear wall to which the sheath is secured.

10. The apparatus of claim 9 wherein each housing includes detent means which deflect inwardly to allow the housing to be inserted through the hole and restore outwardly to permanently secure the housing to the vehicle by engaging the panel adjacent the hole.

11. The apparatus of claim 10 further including means for preventing the housing from rotating in the hole.

12. The apparatus of claim 11 wherein the housing further includes means which cooperate with the reader for preventing the reader from turning within the housing and thereby straining the coded substrate.

13. The apparatus of claim 12 wherein the housing further includes an opening for allowing liquid to drain from the housing and a closure for protecting the open end of the housing.

14. The apparatus of claim 1 further comprising:
a substrate;
conductive and non-conductive areas on the substrate arranged in a unique pattern for creating a code;
a reader having pairs of opposed inductors between which inductors the conductive and non-conductive areas are received, said reader including means for energizing the inductors whereby the conductive areas inhibit transference of induction between inductors with which the conductive areas are aligned while the non-conductive areas do not inhibit such transferance, said reader further including means for checking the inductors individually to determine the pattern by sensing the inductance transfered between inductors.

15. The apparatus of claim 14 wherein the checking means includes multiplexing means for checking the inductors one-by-one.

16. In combination, apparatus for monitoring the dispensing of fuel; a fuel, supply, and a fleet of vehicles, each vehicle having a fuel tank with a filling opening, the combination comprising:
a plurality of passive identification devices, one for each vehicle in the fleet; each device including a secret code unique to a particular vehicle in the fleet, the secret code being configured by a pattern of conductive areas on a substrate; the passive identification devices each further including opaque covering means of insulating material overlying the substrate and the pattern of conductive areas to obscure the pattern, to protect the conductive areas from the environment and to prevent the occurrence of sparks;
a housing for each identification device, each housing including means for fixing the identification device therein and alignment means;
means on each vehicle in the fleet for mounting the housing on that vehicle, the mounting means being displaced from, but in the vicinity of, the filling opening of the vehicle fuel tank;
portable means for reading the identification devices upon aligning the portable means with the alignment means of the housing;
code processing means, remote from and physically separate from the portable means but connected to the fuel supply for coordinating the secret code with the amount of fuel dispensed by the fuel supply, and
an R.F. link for connecting the portable reading means to the code processing means to radio to the code from the portable means to the code processing means.

17. The combination of claim 16 wherein the portable means includes an array of opposed inductor pairs for detecting any possible pattern of conductive areas on the passive identification device disposed between the inductors; wherein the portable means includes means for energizing the sensors, whereby the conductive areas inhibit transference of induction between the inductors with which the conductive areas are aligned, and wherein the portable means includes means for checking the opposed inductor pairs to determine the pattern by detecting those opposed inductor pairs which have conductive areas therebetween and those which do not.

* * * * *